(12) United States Patent
Yoshizawa

(10) Patent No.: US 10,123,363 B2
(45) Date of Patent: *Nov. 6, 2018

(54) COMMUNICATION TERMINAL, COMMUNICATION METHOD, BASE STATION AND COMMUNICATION SYSTEM

(71) Applicant: SONY CORPORATION, Tokyo (JP)

(72) Inventor: Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,365

(22) Filed: May 26, 2017

(65) Prior Publication Data

US 2017/0265249 A1 Sep. 14, 2017

Related U.S. Application Data

(63) Continuation of application No. 14/358,096, filed as application No. PCT/JP2012/078912 on Nov. 8, 2012, now Pat. No. 9,706,597.

(30) Foreign Application Priority Data

Dec. 2, 2011 (JP) .................................. 2011-264437

(51) Int. Cl.
  *H04W 52/02* (2009.01)
  *H04W 68/02* (2009.01)
  (Continued)

(52) U.S. Cl.
  CPC ..... *H04W 76/048* (2013.01); *H04W 52/0216* (2013.01); *H04W 68/02* (2013.01); *H04W 76/28* (2018.02); *H04W 52/0229* (2013.01); *H04W 84/027* (2013.01); *Y02D 70/00* (2018.01); *Y02D 70/1262* (2018.01); *Y02D 70/21* (2018.01); *Y02D 70/24* (2018.01)

(58) Field of Classification Search
  CPC . H04W 52/0216; H04W 68/02; H04W 76/28; H04W 52/0229; H04W 84/027; H04W 76/048
  See application file for complete search history.

(56) References Cited

U.S. PATENT DOCUMENTS

2007/0291673 A1  12/2007  Demirhan et al.
2008/0031160 A1  2/2008  Ryu et al.
(Continued)

FOREIGN PATENT DOCUMENTS

JP  2001-168998 A  6/2001
JP  2007-053628 A  3/2007
(Continued)

OTHER PUBLICATIONS

Extended European Search Report of EP Patent Application No. 16183538.4, dated Oct. 26, 2016, 08 pages.

(Continued)

*Primary Examiner* — Walter Divito
*Assistant Examiner* — Anthony Luo
(74) *Attorney, Agent, or Firm* — Chip Law Group

(57) ABSTRACT

Provided is a communication terminal including circuitry that detects arrival of timing according to a configured cycle, determines whether or not a shared condition shared with a base station is satisfied, and controls reception of paging when the arrival of timing is detected and the shared condition is determined to be satisfied.

12 Claims, 9 Drawing Sheets

(51) Int. Cl.
*H04W 76/28* (2018.01)
*H04W 84/02* (2009.01)
*H04W 76/04* (2009.01)

(56) References Cited

U.S. PATENT DOCUMENTS

| | | |
|---|---|---|
| 2010/0110965 A1 | 5/2010 | Kojima |
| 2010/0240400 A1 | 9/2010 | Choi |
| 2010/0248750 A1 | 9/2010 | Mueller et al. |
| 2010/0331019 A1 | 12/2010 | Bhattacharjee et al. |
| 2011/0195709 A1 | 8/2011 | Christensson et al. |
| 2013/0094418 A1 | 4/2013 | Park et al. |

FOREIGN PATENT DOCUMENTS

| | | |
|---|---|---|
| JP | 2008-508779 A | 3/2008 |
| JP | 2010-050969 A | 3/2010 |
| JP | 2010-232707 A | 10/2010 |
| JP | 2010-288278 A | 12/2010 |
| JP | 2011-050087 A | 3/2011 |
| JP | 2013-509138 A | 3/2013 |
| WO | 2008/041823 A2 | 4/2008 |
| WO | 2011/056681 A1 | 5/2011 |
| WO | 2011/087233 A2 | 7/2011 |
| WO | 2011/102280 A1 | 8/2011 |

OTHER PUBLICATIONS

"Extended Paging Cycles", SA WG2 Meeting #86, Nokia Siemens Networks, Nokia, Ericsson, ST-Ericsson, InterDigital, Jul. 11-15, 2011, 03 pages.
Office Action for the JP Patent Application No. 2013-547080, dated Mar. 15, 2016, 08 pages of Office Action and 04 pages of English Translation.
Motorola, et al., "Rb Combinations in Feature Group Indicator 20", 3GPP TSG-RAN WG2 #67, R2-09521, 3GPP SG-RAN-WG2 Meeting #67, Shenzhen, China, Aug. 24-28, 2009, 05 pages.
Extended European Search Report for EP Patent Application No. 12853962.4 dated Jul. 8, 2015.
Nokia Siemens Networks, et al: "Extended Paging Cycles", 3GPP Draft, S2-113391_WAS112592_EXTENDED_PAGING_CYCLES, 3rd Generation Partnership Project (3GPP), Mobile Competence Centre; 650, Route Des Lucioles, F-06921, Sophia-Antipolis Cedex; France, vol. SA WG2, No. Naantali, Jul. 5, 2011, XP050548666.
Rapporteur (Nokia Corporation), Paging Details, 3GPP TSG-RAN WG2 Meeting #62, R2-082554, May 5, 2008, 07 pages.
Non-Final Rejection for U.S. Appl. No. 14/358,096, dated Dec. 15, 2015, 14 pages.
Final Rejection for U.S. Appl. No. 14/358,096, dated May 16, 2016, 15 pages.
Notice of Allowance and Fees Due (PTOL-85) for U.S. Appl. No. 14/358,096, dated Feb. 13, 2017, 05 pages.
Notice of Allowance and Fees Due (PTOL-85) for U.S. Appl. No. 14/358,096, dated Jun. 12, 2017, 02 pages.
Advisory Action for U.S. Appl. No. 14/358,096, dated Aug. 12, 2016, 3 pages.
Office Action for CN Patent Application No. 201280058048.7, dated Apr. 12, 2017, 08 pages of Office Action and 12 pages of English Translation.

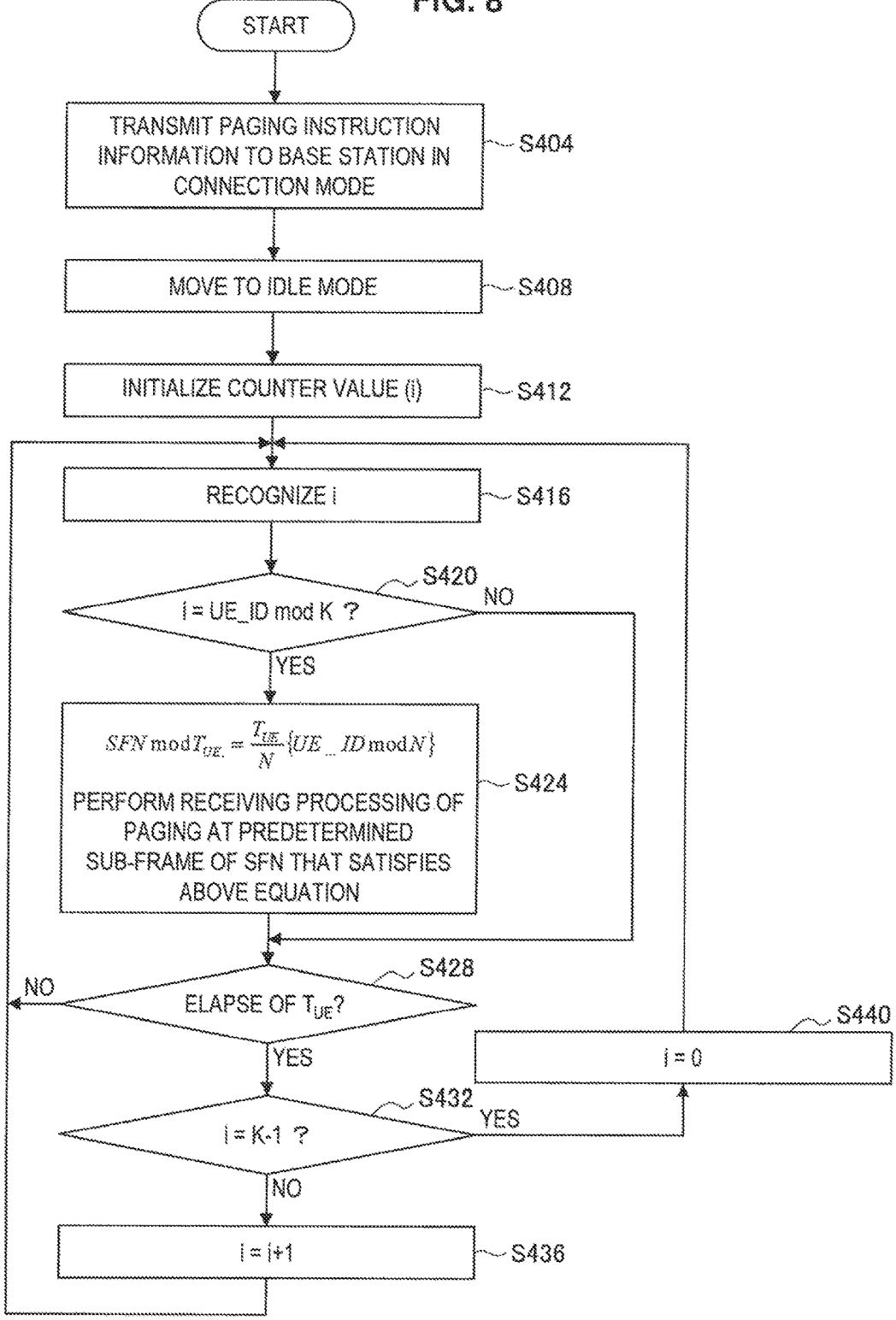

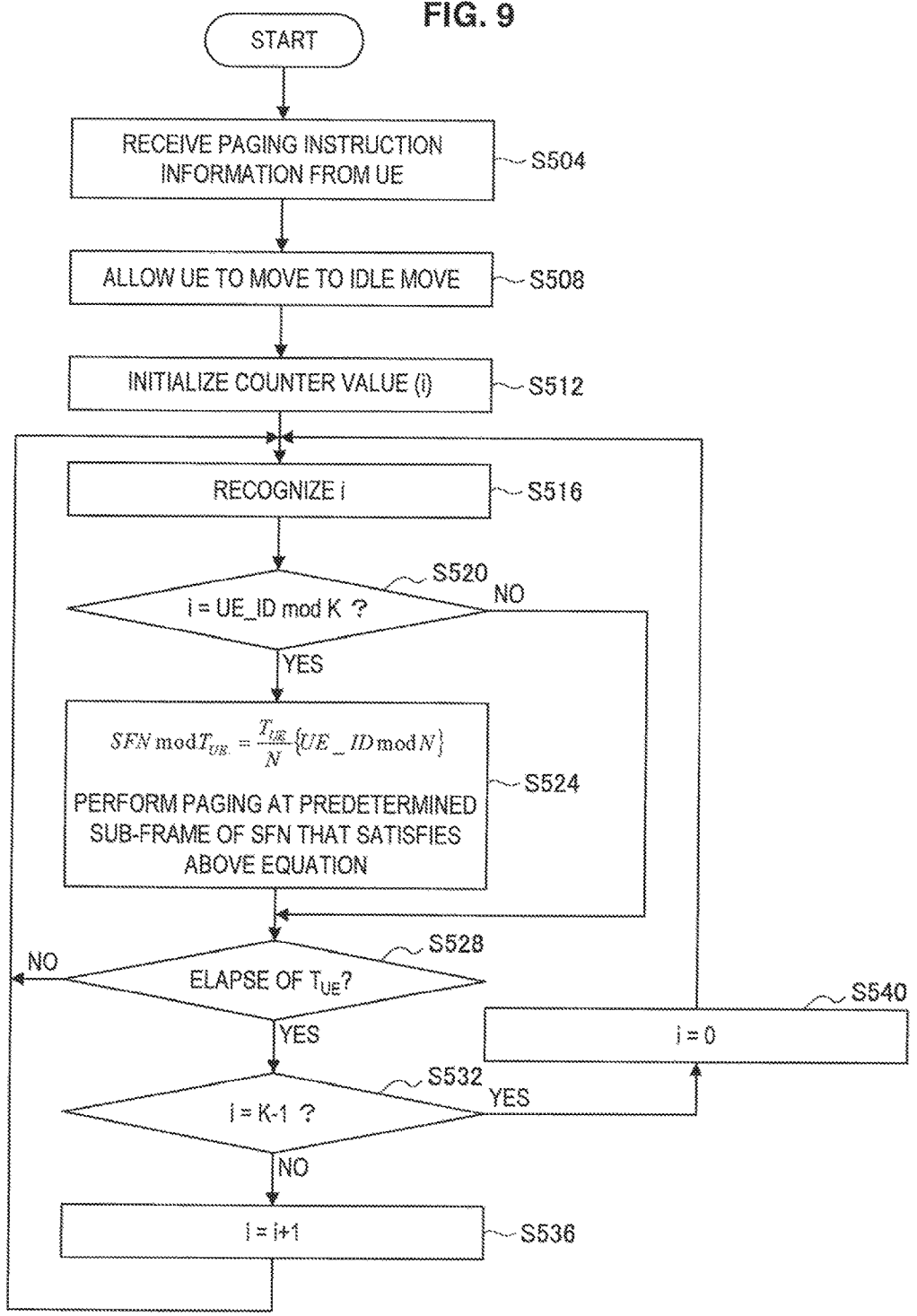

COMMUNICATION TERMINAL, COMMUNICATION METHOD, BASE STATION AND COMMUNICATION SYSTEM

CROSS REFERENCE TO RELATED APPLICATIONS

The present application is a continuation application of U.S. patent application Ser. No. 14/358,096 filed May 14, 2014, which is a National Stage entry of PCT/JP2012/078912, filed Nov. 8, 2012, which claims the benefit of Japanese Priority Patent Application JP 2011-264437 filed on Dec. 2, 2011, the entire contents of which are incorporated herein by reference.

TECHNICAL FIELD

The present disclosure relates to a communication terminal, a communication method, a base station and a communication system.

BACKGROUND ART

Currently, standardization of LTE radio communication systems is under progress by 3GPP (Third Generation Partnership Project). According to LTE, improvement in maximum communication speed and quality improvement in cell edges can be attained by using technologies such as relays and carrier aggregation. Moreover, considerations are given to improving coverage by introducing base stations other than eNodeB (macro-cell base station), such as HeNodeB (Home eNodeB), a femtocell base station, a compact base station for cell phones, and RHH (Remote Radio Head).

Moreover, discussion on MTC (Machine Type Communications) is also in progress in the 3GPP. The MTC is generally synonymous to M2M (Machine to Machine) and refers to a communication between machines and not directly used by a human. The MTC primarily is performed between a server and an MTC terminal that is not directly used by a human and is considered as a noticeable element technology for efficiently coupling dispersing devices, for example, in a sensor network.

When the LTE is applied to the above-mentioned MTC, a battery for MTC terminals is desirable as less frequently to be replaced as possible because the battery replacement highly costs manpower and MTC terminals can possibly be installed in places having difficulty of the battery replacement.

Incidentally, it is thought that average power consumption of a terminal can be reduced by extending a paging cycle longer in LTE idle mode than in connection mode. In addition, Patent Literature 1 and Patent Literature 2 disclose improvement of the paging scheme.

CITATION LIST

Patent Literature

Patent Literature 1: JP 2010-288278A
Patent Literature 2: JP 2010-050969A

SUMMARY OF INVENTION

Technical Problem

Nevertheless, since the paging cycle defined in LTE is 2.56 s (256 system frames) at the longest, the power consumption is difficult to be sufficiently reduced.

Therefore, the present disclosure proposes a communication terminal, a communication method, a base station and a communication system which are novel and improved and by which a processing interval for paging can be made longer.

Solution to Problem

According to the present disclosure, there is provided a communication terminal including a timing detection unit that detects arrival of timing according to a configured cycle, a condition determination unit that determines whether or not a shared condition shared with a base station is satisfied, and a communication controller that controls reception of paging when the timing detection unit detects the arrival of timing and the condition determination unit determines that the shared condition is satisfied.

According to the present disclosure, there is provided a communication method including detecting arrival of timing according to a configured cycle, determining whether or not a shared condition shared with a base station is satisfied, and controlling reception of paging when the arrival of timing is detected and it is determined that the shared condition is satisfied.

According to the present disclosure, there is provided a base station including a timing detection unit that detects arrival of timing according to a configured cycle, a condition determination unit that determines whether or not a shared condition shared with a communication terminal is satisfied, and a communication controller that controls transmission of paging to the communication terminal when the timing detection unit detects the arrival of timing and the condition determination unit determines that the shared condition is satisfied.

According to the present disclosure, there is provided a communication method including detecting arrival of timing according to a configured cycle, determining whether or not a shared condition shared with a communication terminal is satisfied, and controlling transmission of paging to the communication terminal when the arrival of timing is detected and it is determined that the shared condition is satisfied.

According to the present disclosure, there is provided a communication system including a base station including a first timing detection unit that detects arrival of timing according to a configured cycle, a first condition determination unit that determines whether or not a shared condition is satisfied, and a first communication controller that controls transmission of paging when the first timing detection unit detects the arrival of timing and the first condition determination unit determines that the shared condition is satisfied, and a communication terminal including a second timing detection unit that detects the arrival of timing according to the configured cycle, a second condition determination unit that determines whether or not the shared condition shared with the base station is satisfied, and a second communication controller that controls reception of paging when the second timing detection unit detects the arrival of timing and the second condition determination unit determines that the shared condition is satisfied.

Advantageous Effects of Invention

As described above, according to the present disclosure, a processing interval for paging can be made longer.

BRIEF DESCRIPTION OF DRAWINGS

FIG. 8 is a flowchart illustrating operation of the UE according to the embodiment.

FIG. 9 is a flowchart illustrating operation of the base station according to the embodiment.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

In this specification and the drawings, a plurality of elements that have substantially the same function and structure may be distinguished by attaching different alphabets to the end of the same reference signs. For example, a plurality of configurations having substantially the same function and configuration is distinguished like UE 20A, UE 20B, and UE 20C when necessary. However, if there is no need to specifically distinguish each of a plurality of elements having substantially the same function and configuration, only the same reference sign is attached. For example, if there is no need to specifically distinguish UE 20A, UE 20B, and UE 20C, the configuration is simply called UE 20.

Moreover, the present disclosure is described in the following item order.
1. Overview of Radio Communication System
   1-1. Configuration of Radio Communication System
   1-2. Frame Configuration
   1-3. Paging
   1-4. DRX Cycle
   1-5. Paging Timing
   1-6. Background of Embodiment
2. Overall Flow of Radio Communication System
3. Configuration of Base Station
4. Configuration of UE
5. Operation of Base Station and UE
6. Conclusion

1. Overview of Radio Communication System

Currently, standardization of LTE radio communication systems is in progress in 3GPP. The embodiments according to the present invention can be adapted to an LTE radio communication system as above by way of example and, first, an overview of the LTE radio communication system will be described.

(1-1. Configuration of Radio Communication System)

Figure 1:
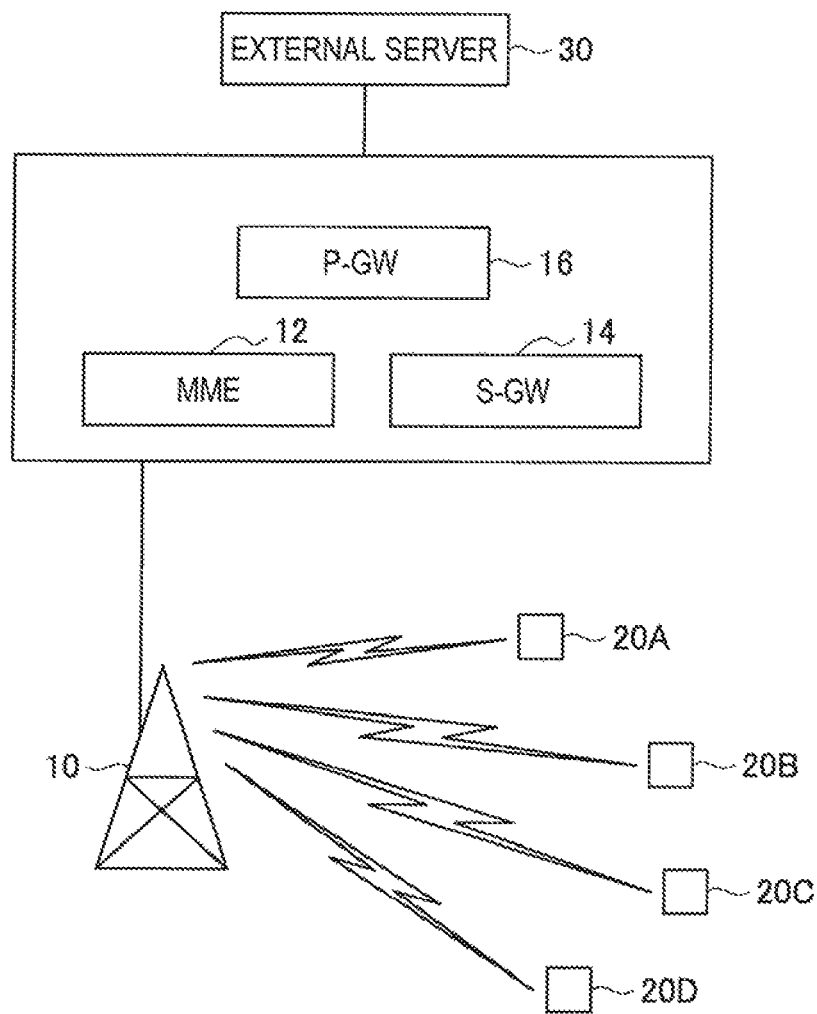
FIG. 1 is an explanatory drawing illustrating an exemplary configuration of a radio communication system.

FIG. 1 is an explanatory drawing of an exemplary configuration of a radio communication system. As illustrated in FIG. 1, the radio communication system includes a base station 10, a core network including an MME (Mobility Management Entity) 12, an S-GW (Serving Gateway) 14 and a P-GW 16 (Packet Data Network Gateway), UEs (User Equipments) 20 and an external server 30.

The embodiment according to the present invention can be adapted to radio communication devices such as the base station 10 and the UEs 20 illustrated in FIG. 1. Notably, the base station 10 may be, for example, an eNodeB, a relay node or a Home eNodeB which is a compact base station for home use. Moreover, the UEs 20 may be either non-MTC terminals such as a mobile phone and a PC (Personal Computer) or MTC terminals specialized for MTC which refers to a communication between machines and not directly used by a human discussed in the 3GPP.

The base station 10 is a radio base station configured to communicate with the UEs 20. FIG. 1 illustrates only one base station 10, whereas a number of base stations 10 are connected to the core network in reality.

The MME 12 is a device configured to perform controls of settings, opening and hand-over of a data communication session. The MME 12 is connected to the base station 10 via an interface called 51.

The S-GW 14 is a device configured to perform routing, transfer and the like of user data. The P-GW 16 functions as a connecting node with an IP service network and transfers the user data to and from the IP service network.

The UE 20 is a communication terminal configured to perform radio communication with the base station 10. The UE 20 performs radio communication with the base station 10 according to an application. Moreover, the UE 20 performs bidirectional communication with the external server 30 via the core network. Notably, the external server 30 may be either a server device installed by an LTE carrier or a server device of an Internet information service carrier externally connecting to the LTE network.

The UE 20 operating as an MTC terminal by way of example generally has the following features, whereas not every MTC terminal 20 needs to have all of the following features but which of the features is to be assigned depends on an application.

Scarce needs to move (Low Mobility)
Transmission of small data (Online Small Data Transmission)
Very low power consumption (Extra Low Power Consumption)
Handled by grouping respective MTCs (Group-based MTC Features)

(1-2. Frame Configuration)

The above-mentioned base station 10 and UEs 20 perform communication according to a common frame format. Hereafter, a specific example of the frame format is described with reference to FIG. 2.

Figure 2:
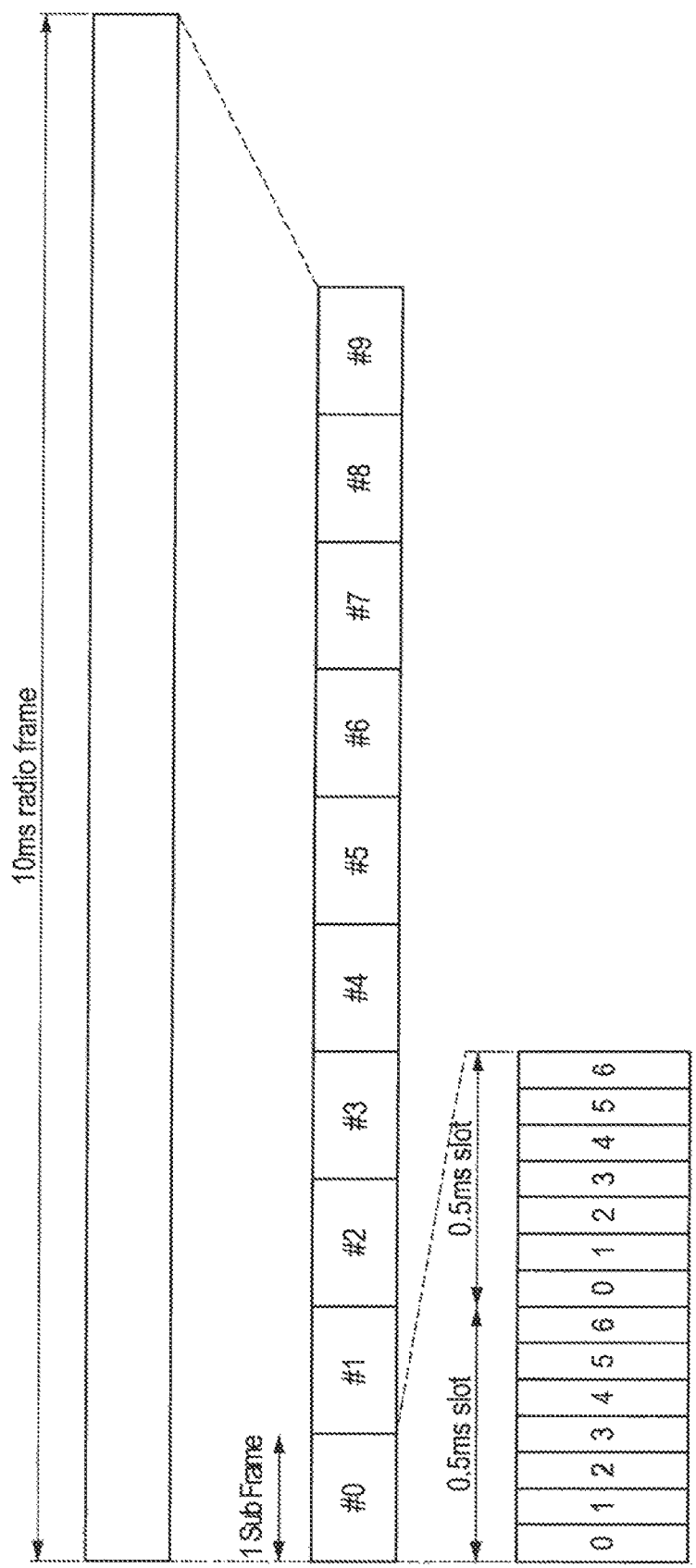
FIG. 2 is an explanatory drawing illustrating an LTE frame format.

FIG. 2 is an explanatory drawing illustrating an LTE frame format. As illustrated in FIG. 2, a 10-ms radio frame is configured of ten 1-ms sub-frames #0 to #9. A number identifier called system frame number (SFN) is assigned to each of 10-ms radio frames and the system frame number increases from 0 to 1023. Moreover, each of the 1-ms sub-frames is configured of two 0.5-ms slots. Furthermore, each of the 0.5-ms slots is configured of seven Ofdm symbols.

Notably, the Ofdm symbol is a unit used in a communication scheme of an OFDM (Orthogonal Frequency Division Multiplexing) modulation system and is a unit by which data processed in one time of FFT (Fast Fourier Transform) is outputted.

Moreover, at the head of each 1-ms sub-frame illustrated in FIG. 2, a control signal called PDCCH (Physical Downlink Control Channel) is added. One Ofdm symbol to three Ofdm symbols at the head of the sub-frame are used for transmission of the PDCCH. Namely, there is a case where one Ofdm symbol is used for transmission of the PDCCH or there is also a case where three Ofdm symbols are used for the same.

Notably, a region in the radio frame used for transmission of the PDCCH is called a control region and a region in the radio frame used for transmissions of a PDSCH (Physical Downlink Shared Channel) or a PUSCH (Physical Uplink Shared Channel) is called a data region.

(1-3. Paging)

The embodiment relates to communication between the above-mentioned base station 10 and UEs 20 and specifically relates to paging from the base station 10 to the UEs 20. Therefore, the paging in LTE will be described, followed by specific description of the embodiment.

The base station transmits a paging message for calling each UE to each UE that is in idle mode in paging timing according to a constant period such as a discontinuous reception period called DRX (Discontinuous Reseption) cycle for each UE. Namely, the base station transmits the paging message in a paging cycle corresponding to the DRX cycle for each UE. As above, a calling procedure for calling a UE by means of transmission of a paging message is the paging. Meanwhile, the UE in idle mode confirms whether or not a paging message is transmitted in paging timing according to the DRX cycle and performs power saving by turning off power supply for primary circuits for reducing battery power consumption to as less an extent as possible in a period except the paging timing.

Figure 3:
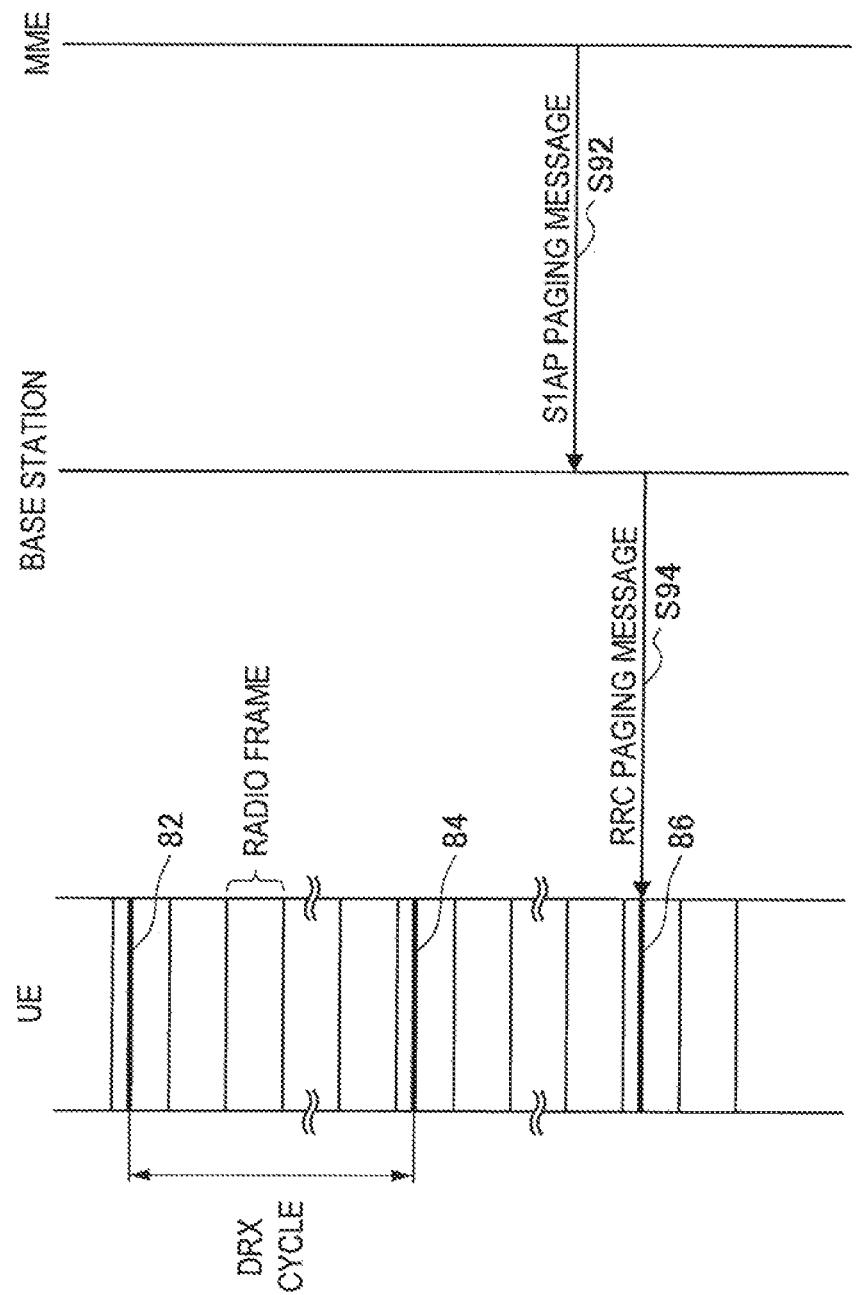
FIG. 3 is an explanatory drawing illustrating a concept of paging.

FIG. 3 is an explanatory drawing illustrating a concept of paging. As illustrated in FIG. 3, the UE confirms whether or not a paging message is transmitted in paging timing 82, 84 and 86 according to the DRX cycle. Since a paging message is not transmitted in paging timing 82 and 84, the UE does not receive a paging message herein.

On the other hand, the base station transmits a paging message (RRC paging message) in paging timing 86 according to the DRX cycle immediately after reception of an S1AP paging message from the MME (S92 and S94). Therefore, the UE can receive the paging message in the paging timing 86.

More in detail, the UE monitors whether or not there is information indicating the presence of a paging message in the PDCCH in the paging timing, using a fixed value (FFFE) as a P-RNTI (Radio Network Temporary Identify) for paging. Then, when the fixed value (FFFE) is detected as the P-RNTI in the paging timing, the UE decodes the paging message succeedingly transmitted in the PDSCH. The paging message includes a terminal ID (S-TMSI: SAE Temporary Mobile Subscriber Identifier) of the target UE, network domain information (circuit/packet), SI change information, ETWS information, and the like. When the UE recognizes that the paging message is to itself, it starts connection to the base station in a random access manner.

(1-4. DRX Cycle)

As above, the overview of the paging has been described. Succeedingly, the above-mentioned DRX cycle and paging timing are described more specifically. Notably, the 10-ms radio frame is hereinafter referred to as system frame.

The DRX cycle includes a cell inherent DRX cycle (discontinuous reception cycle common in a cell) which is assigned to and common to all the UEs in the cell and user inherent DRX cycles (discontinuous reception cycle for a terminal) which are individually assigned to the UEs.

The cell inherent DRX cycle takes any value of 4 system frame numbers of 32, 64, 128 and 256 and is reported as 2-bits information with system information SIB2. Notably, since 1 system frame length is 10 ms, 32 system frames, 64 system frames, 128 system frames and 256 system frames correspond to 320 ms, 640 ms, 1.28 s and 2.56 s, respectively.

Similarly, the user inherent DRX cycle is 2-bits information indicating any of 4 system frame numbers of 32, 64, 128 and 256. The user inherent DRX cycle is reported from the MME to the base station and the UE with the S1AP paging message. Otherwise, the user inherent DRX cycle is reported to the network side in connection request from the UE or with an update message of a tracking area.

(1-5. Paging Timing)

The paging timing is determined according to the above-described DRX cycle. For example, 3GPP TS36.304 describes the following formulae for determining the LTE paging timing.

[Math. 1]

$$SFN \bmod T = \frac{T}{N}\{UE\_ID \bmod N\} \qquad \text{(formula 1)}$$

[Math. 2]

$$i_s = \text{Floor}\{UE\_ID/N\} \bmod N_s \qquad \text{(formula 2)}$$

[Math. 3]

$$T = \min\{T_c, T_{UE}\} \qquad \text{(formula 3)}$$

[Math. 4]

$$N = \min\{T, nB\} \qquad \text{(formula 4)}$$

[Math. 5]

$$N_s = \max\{1, nB/T\} \qquad \text{(formula 5)}$$

In the above-mentioned formulae, SFN denotes a system frame number taking any value of 0 to 1023, T denotes a DRX cycle, UE_ID denotes lower 10 bits of IMIS stored in a UE's USIM card, and nB denotes a parameter reported from the network and takes any value of 4T, 2T, T, T/2, T/4, T/8, T/16 and T/32.

Formula 1 mentioned above indicates an algorithm for determining the system frame number to undergo the paging in LTE. The base station performs the paging with this SFN in accordance with formula 1 above when the remainder obtained by dividing the SFN by the DRX cycle T is equal to the value obtained by the right side. Notably, as indicated by formula 3, the smaller one of the cell inherent DRX cycle (Tc) and the user inherent DRX cycle (TUE) is used as a DRX cycle T. When the user inherent DRX cycle TUE is not assigned, the cell inherent DRX cycle Tc is used as the DRX cycle T.

Herein, since the right side of formula 1 includes an operation using IMIS of the UE, the paging timing for each UE is random timing with a uniform distribution. Notably, formula 2 indicates an algorithm for determining the sub-frame for which the paging is performed in the system frame determined according to formula 1. Similarly in formula 2, since it includes an operation using IMIS, the sub-frame for which the paging is performed is also randomized.

(1-6. Background of Embodiment)

By the way, when LTE is applied to the above-mentioned MTC, a battery for MTC terminals is desirable as less frequently to be replaced as possible because the battery replacement highly costs manpower and MTC terminals can possibly be installed in places having difficulty of the battery replacement. Although it is thought that a DRX cycle in idle mode is made longer, it is difficult for a DRX cycle with a longer period exceeding a cycle of system frames (1024 system frames) to be attained. Hereafter, the reason is described.

As mentioned above, the DRX cycle in idle mode is 32, 64, 128 or 256 system frames. Therefore, the DRX cycle is 2.56 s at the longest. The algorithm for determining the paging timing described in reference to formula 1 restricts the DRX cycle to be less than 1024 system frames (10.24 s) which correspond to the cycle of system frames even if any alternatives for a longer DRX cycle. However, it is assumed that the DRX cycle is desired to be a longer cycle for forthcoming MTC. For example, it is thought that the DRX cycle is desired to be a cycle of 30 seconds, 1 minute or longer for applications giving a first priority to the service life of batteries.

As to this point, it is thought that the DRX cycle to be a longer cycle is attained by making the cycle of system frames longer than 1024 system frames. However, this measure is not the best solution, taking compatibility with the existing terminals into consideration, because this affects the whole system.

Moreover, system parameters designating the DRX cycle employ the cell inherent DRX cycle Tc and the user inherent DRX cycle TUE as mentioned above. However, as indicated by formula 3, the algorithm for determining the paging timing employs the smaller one of the cell inherent DRX cycle and the user inherent DRX cycle TUE as the DRX cycle Tc. Accordingly, the DRX cycle is difficult to be attained to be a longer cycle even if the user inherent DRX cycle TUE is made longer than the cell inherent DRX cycle Tc.

On the other hand, the DRX cycle can be made longer if both of the cell inherent DRX cycle Tc and the user inherent DRX cycle TUE are made longer. However, this affects the DRX cycles of all the UEs in the cell. For example, since notification of an ETWS (Earthquake/Tsunami Warning System) is to be included in a paging message, the ETWS does not operate properly if both of the cell inherent DRX cycle Tc and the user inherent DRX cycle TUE are made longer.

Moreover, according to the algorithm for determining the paging timing described with reference to formula 1, since the paging timing for each UE is random timing with a uniform distribution, concentration of radio resources used for paging can be prevented. This is thought to be preferable when the DRX cycle is 2.56 s at the longest. However, if the DRX cycle is made longer, the paging timing suffers a distribution within the longer cycle. As a result, there is a risk that the paging is performed in timing exceedingly apart from intended timing.

From another viewpoint, the user inherent DRX cycle TUE is reported from the UE in any timing in connection request at initiation of the UE (attaching request) and in updating a tracking area (tracking area updating). However, there is a case where the UE operating as an MTC terminal has low mobility. Moreover, report of the user inherent DRX cycle TUE is not a process which is supposed to be performed in arbitrary timing. Hence, it is supposed that the user inherent DRX cycle TUE is reported to the network in low frequency.

Therefore, the embodiment has been devised directed by the above-mentioned circumstances. According to the embodiment, a processing interval for paging can be made longer individually for every UE to exceed the cycle of system frames. Hereafter, an overall flow, a configuration of the base station 10, a configuration of the UE 20 and the like according to such an embodiment will be sequentially described in detail.

2. Overall Flow of Radio Communication System

Figure 4:
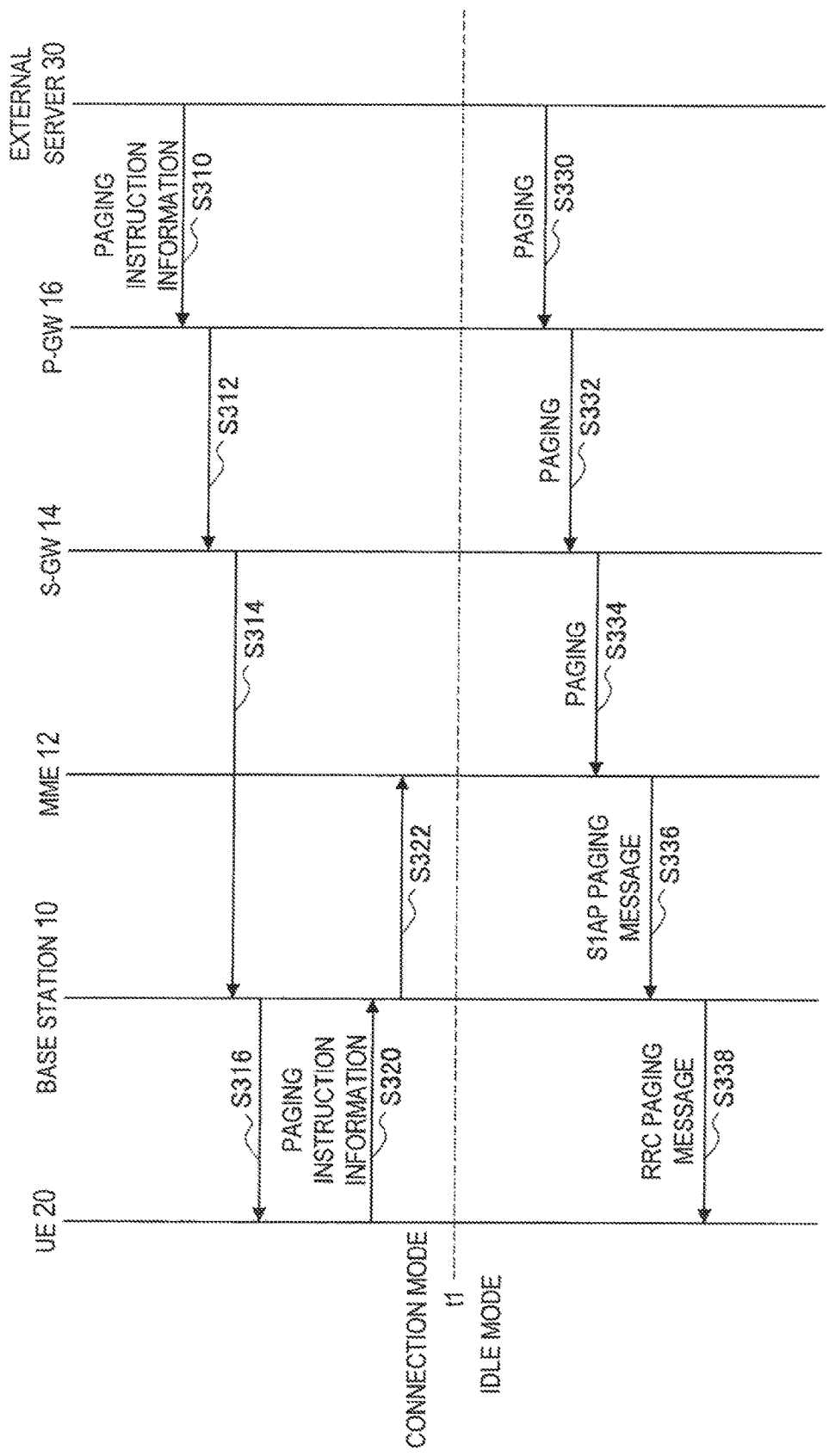
FIG. 4 is an explanatory drawing illustrating an overall flow of the radio communication system according to an embodiment.

FIG. 4 is an explanatory drawing illustrating an overall flow of the radio communication system according to the embodiment. As illustrated in FIG. 4, first, the external server 30 transmits paging instruction information to the UE 20 via the P-GW 16, the S-GW 14 and the base station 10 while the UE 20 is operating in connection mode (S310, S312, S314 and S316).

The paging instruction information includes information regarding a determination method of the paging timing. For example, the paging instruction information includes the user inherent DRX cycle TUE, flag information indicating whether or not a determination method of the paging timing according to the embodiment is performed, an extension parameter K and information regarding re-paging used in a case of failure of the paging. Note that part or all of the above-mentioned information regarding a determination method of the paging timing may be stored in a storage medium such as a SIM card of the UE 20. In this case, the paging instruction information may include information instructing usage of the information stored in the storage medium of the UE 20 for determining the paging timing.

Moreover, the above-mentioned flag information may be FGI (Feature Group Indicator) information. The FGI information is generally used as a bit information string by which the UE 20 indicates affirmative or negative of using a specific function of the UE 20 to the network. The extension parameter K is a parameter for making a processing interval for paging longer as described from <3. Configuration of Base Station> in detail. Notably, the above-mentioned reporting of the paging instruction information may be performed separately into a plurality of times.

Succeedingly, the UE 20 reports the paging instruction information received from the external server 30 to the base station 10 and the MME 12 (S320 and S322). Thereby, the paging instruction information can be shared with the UE 20 and the network side including the base station 10 and the MME 12. Notably, when the information regarding a determination method of the paging timing is stored in the storage medium of the UE 20, the UE 20 may compare the paging instruction information received from the external server 30 with the information stored in the storage medium properly to update the information stored in the storage medium.

Then, after the UE 20 moves to idle mode, the paging is performed in a longer cycle than the cycle of system frames using the paging instruction information shared in connection mode (S330, S332, S334, S336 and S338).

3. Configuration of Base Station

As above, the overall flow of the radio communication system according to the embodiment has been described. Succeedingly, a configuration of the base station 10 according to the embodiment is described with reference to FIG. 5.

Figure 5:
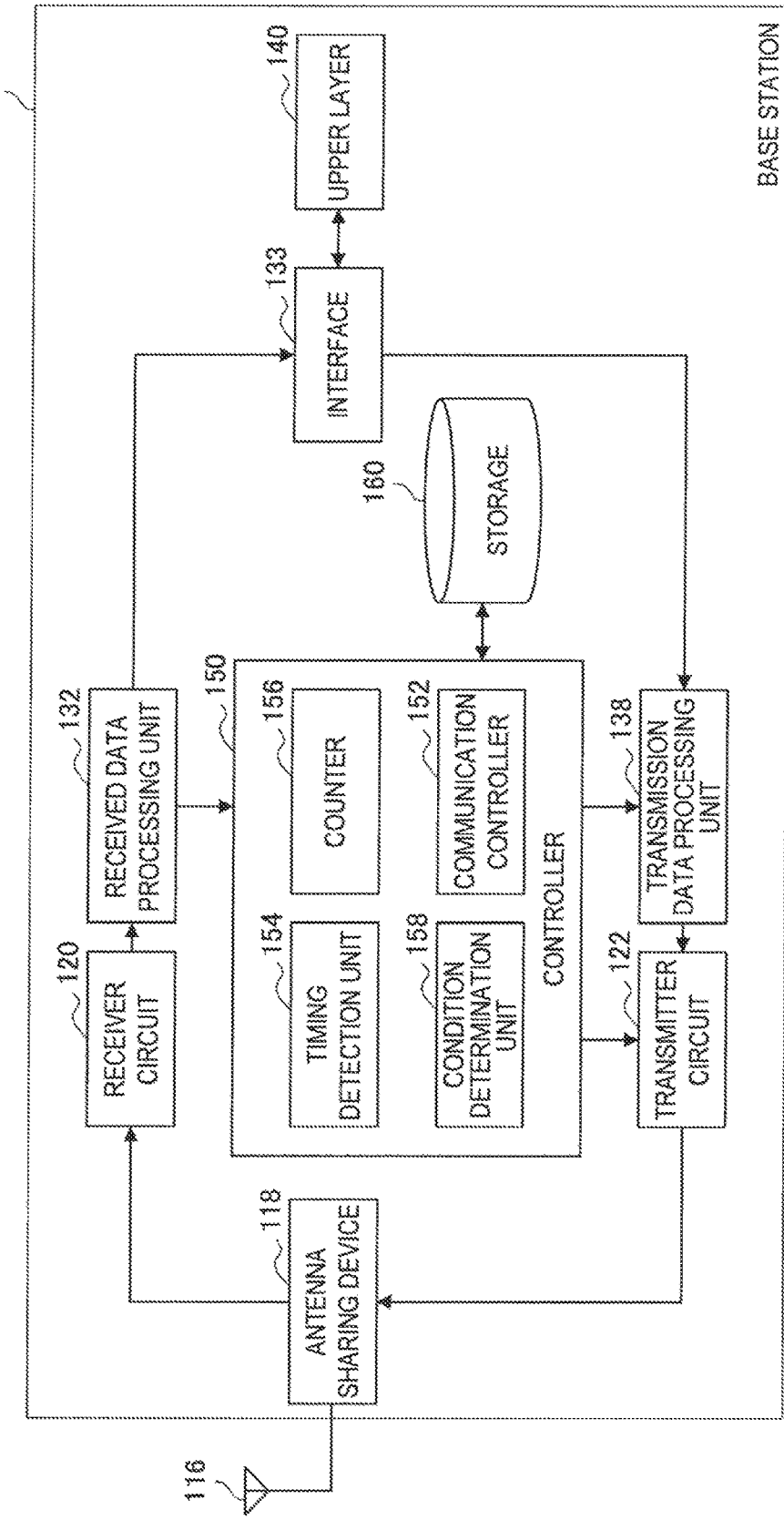
FIG. 5 is a functional block diagram illustrating a configuration of a base station according to the embodiment.

FIG. 5 is a functional block diagram illustrating a configuration of the base station 10 according to the embodiment. As illustrated in FIG. 5, an antenna 116, an antenna sharing device 118, a receiver circuit 120, a transmitter circuit 122, a received data processing unit 132, an interface 133, a transmission data processing unit 138, an upper layer 140, a controller 150 and a storage 160 are included.

The antenna 116 receives a radio signal from the UE 20 and converts the radio signal into an electric received signal. Since the antenna 116 is connected to the receiver circuit 120 via the antenna sharing device 118 in receiving signals, the received signal obtained by the antenna 116 is supplied to the receiver circuit 120.

Moreover, since the antenna 116 is connected to the transmitter circuit 122 via the antenna sharing device 118 in transmitting signals, a transmission signal is supplied to the antenna 116 from the transmitter circuit 122. The antenna 116 transmits the transmission signal to the UE 20 as a radio signal.

Notably, only one antenna is illustrated in FIG. 5 for convenience of explanation, whereas the base station 10 may include a plurality of antennas. When including a plurality of antennas, the base station 10 can perform MIMO (Multiple Input Multiple Output) communication, diversity communication and the like.

The receiver circuit 120 performs demodulation processing, decoding processing and the like on the received signal supplied from the antenna 116 and supplies the received data after the processing to the received data processing unit 132. As above, the receiver circuit 120 functions as a receiving unit in cooperation with the antenna 116.

The transmitter circuit 122 performs modulation processing and the like on a control signal supplied from the controller 150 (PDCCH, BCH and the like) and a data signal supplied from the transmission data processing unit 138 (PDSCH) and supplies the transmission signal after the processing to the antenna 116. As above, transmitter circuit 122 functions as a transmitting unit in cooperation with the antenna 116.

The received data processing unit 132 analyzes the received data supplied from the receiver circuit 120. Then, the received data that is for the upper layer 140 is supplied to the interface 133. On the other hand, the paging instruction information that is received from the UE 20 is supplied to the controller 150 to be stored in the storage 160.

The interface 133 is an interface to and from the upper layer 140. The received data is outputted from the interface 133 to the upper layer 140 and the transmission data is inputted from the upper layer 140 to the interface 133.

The transmission data processing unit 138 generates a data signal on the basis of the data supplied from the interface 133 to supply it to the transmitter circuit 122.

The controller 150 includes a communication controller 152, a timing detection unit 154, a counter 156 and a condition determination unit 158. The storage 160 stores the paging instruction information. The controller 150 controls the whole operations of the base station 10 using the paging instruction information stored in the storage 160.

(Timing Detection Unit)

The timing detection unit 154 detects paging candidate timing which arrives according to the user inherent DRX cycle TUE included in the paging instruction information, regarding the target UE 20. For example, the timing detection unit 154 may detect the paging candidate timing according to formula 6 below.

[Math. 6]

$$SFN \bmod T_{UE} = \frac{T_{UE}}{N}\{UE\_ID \bmod N\} \quad \text{(formula 6)}$$

When the remainder obtained by dividing the SFN by the user inherent DRX cycle TUE is equal to the value obtained in the right side, the timing detection unit 154 detects the relevant SFN as the paging candidate timing according to formula 6 above. Notably, formula 6 by way of example indicates that the SFN is divided by the user inherent DRX cycle TUE, whereas the detection method of the paging timing is not limited to the above example. For example, the timing detection unit 154 may use the cell inherent DRX cycle Tc in place of the user inherent DRX cycle TUE or may use the smaller one of the cell inherent DRX cycle Tc and the user inherent DRX cycle TUE as indicated by formula 3.

(Counter)

The counter 156 counts elapse of a predetermined period. For example, the counter 156 starts counting from "0", increments a count value i every time the user inherent DRX cycle TUE elapses, and resets the count value i to "0" when the count value i reaches the extension parameter K included in the paging instruction information. Notably, the explanation is made for usage of the user inherent DRX cycle TUE by way of example as the predetermined period above, whereas the predetermined period may be the cell inherent DRX cycle Tc or may be a period in relation to neither the user inherent DRX cycle TUE nor the cell inherent DRX cycle Tc.

(Condition Determination Unit)

The condition determination unit 158 determines whether or not a shared condition shared with the UE 20 regarding the paging is satisfied. For example, the condition determination unit 158 determines that the shared condition is satisfied when the count value i obtained by the counter 156 is equal to a setting value x shared with the UE 20. Herein, the setting value x by way of example is represented as in formula 7 below. Notably, the setting value x is not limited to the value indicated by formula 7. For example, the setting value x may be a value directly designated from the external server 30.

[Math. 7]

$$x = UE\_ID \bmod K \quad \text{(formula 7)}$$

(Communication Controller)

The communication controller 152 controls transmission of the paging to the UE 20 when the timing detection unit 154 detects the paging candidate timing and the condition determination unit 158 determines that the count value obtained by the counter 156 is equal to the setting value x. According to such a configuration, the period of the paging timing can be extended, for example, to the multiplication value of the inherent DRX cycle TUE and the extension parameter K. Hereafter, this is described more specifically with reference to FIG. 6.

Figure 6:
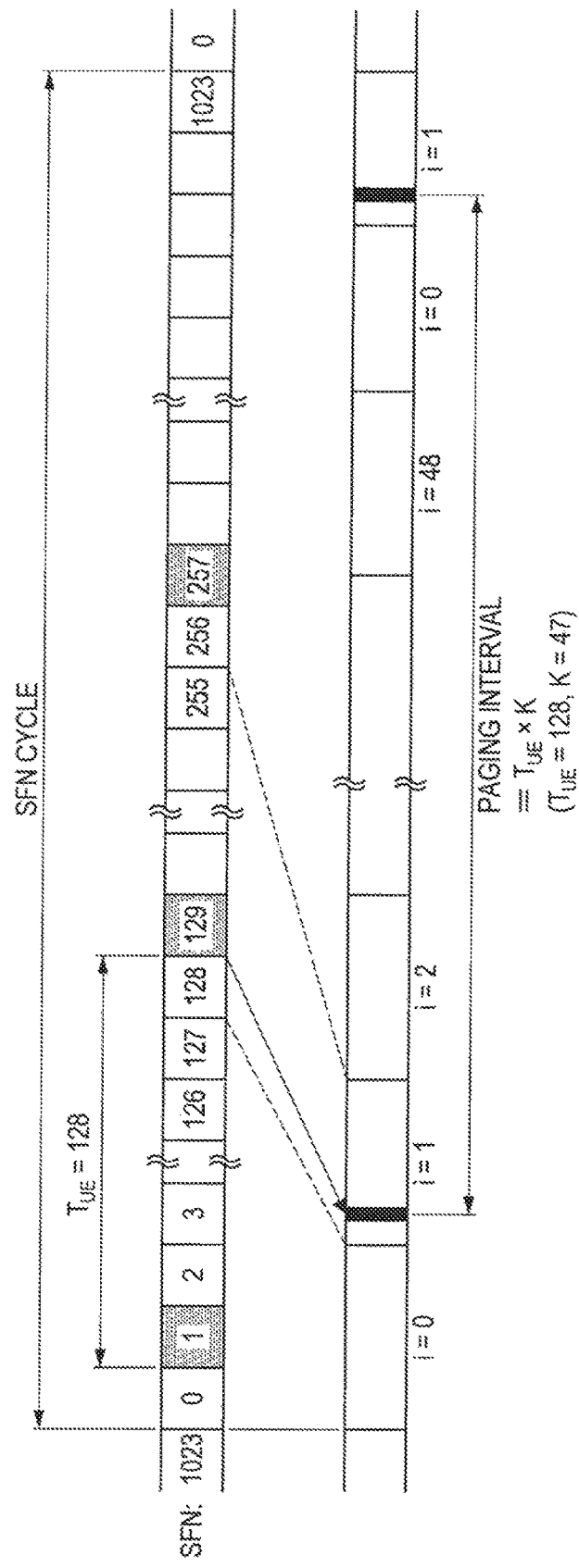
FIG. 6 is an explanatory drawing illustrating a specific example of paging timing according to the embodiment.

FIG. 6 is an explanatory drawing illustrating a specific example of the paging timing according to the embodiment. Notably, FIG. 6 by way of example illustrates that the user inherent DRX cycle TUE is 128 (system frames), the extension parameter K is 47 and the setting value x is 1.

When the user inherent DRX cycle TUE is 128, the paging candidate timing arrives at an interval of 128 system frames, as illustrated in FIG. 6, at the SFNs being "1", "129"

and "257". Notably, although the paging candidate timing corresponds to the normal paging timing, the paging is not always performed at all the pieces of paging candidate timing in the embodiment.

Namely, the communication controller 152 performs the paging when the count value i obtained by the counter 156 is equal to the setting value x in the paging candidate timing. For example, as illustrated in FIG. 6, the count value i is "0" for the SFN being "1" which is in the paging candidate timing, but is different from the setting value x being "1". Therefore, the communication controller 152 does not perform the paging. Meanwhile, since the count value i is "1" for the SFN being "129" which is in the paging candidate timing, and is equal to the setting value x being "1", the communication controller 152 performs the paging. Afterwards, the communication controller 152 does not perform the paging until the count value i reaches "46" and is reset to "0" to become "1" again, and performs the paging in the paging candidate timing when the count value i becomes "1".

Namely, when the user inherent DRX cycle TUE is 128 (system frames) and the extension parameter K is 47, the interval of the paging timing can be extended to 6016 system frames (approximately 1 minute) which is the multiplication value of TUE and K.

As described above, the base station 10 according to the embodiment can make the interval of the paging timing longer. As a result, power consumption in the UE 20 can be reduced.

Notably, the communication controller 152 may determine paging timing for sub-frames according to formula 2 or may determine it according to a method separately instructed from the external server 30. Moreover, when the paging to the UE 20 has resulted in failure, the paging may be performed again based on information regarding re-paging which is included in the paging instruction information.

4. Configuration of UE

As above, the configuration of the base station 10 according to the embodiment has been described. Succeedingly, a configuration of the UE 20 according to the embodiment is described with reference to FIG. 7.

Figure 7:
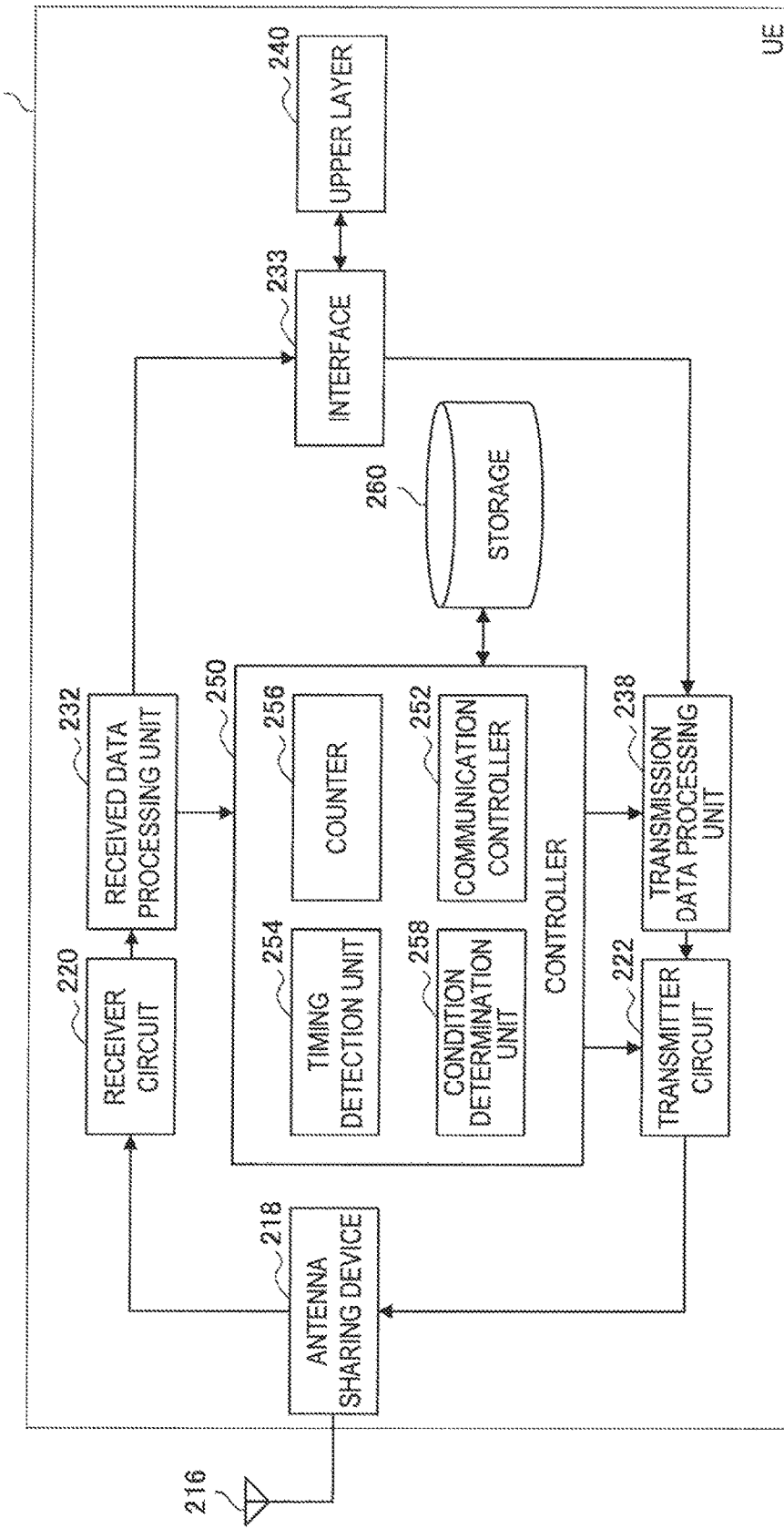
FIG. 7 is a functional block diagram illustrating a configuration of a UE according to the embodiment.

FIG. 7 is a functional block diagram illustrating a configuration of the UE 20 according to the embodiment. As illustrated in FIG. 7, the UE 20 according to the embodiment includes an antenna 216, an antenna sharing device 218, a receiver circuit 220, a transmitter circuit 222, a received data processing unit 232, an interface 233, a transmission data processing unit 238, an upper layer 240, a controller 250 and a storage 260.

The antenna 216 receives a radio signal from the base station 10 and converts the radio signal into an electric received signal. Since the antenna 216 is connected to the receiver circuit 220 via the antenna sharing device 218 in receiving signals, the received signal obtained by the antenna 216 is supplied to the receiver circuit 220.

Moreover, since the antenna 216 is connected to the transmitter circuit 222 via the antenna sharing device 218 in transmitting signals, a transmission signal is supplied to the antenna 216 from the transmitter circuit 222. The antenna 216 transmits the transmission signal to the base station 10 as a radio signal.

Notably, only one antenna is illustrated in FIG. 7 for convenience of explanation, whereas the UE 20 may include a plurality of antennas. When including a plurality of antennas, the UE 20 can perform MIMO communication, diversity communication and the like.

The receiver circuit 220 performs demodulation processing, decoding processing and the like on the received signal supplied from the antenna 216 and supplies the received data after the processing to the received data processing unit 232. As above, the receiver circuit 220 functions as a receiving unit in cooperation with the antenna 216.

The transmitter circuit 222 performs modulation processing and the like on a control signal supplied from the controller 250, a data signal supplied from the transmission data processing unit 238 and the like and supplied the transmission signal after the processing to the antenna 216. As above, the transmitter circuit 222 functions as a transmitting unit in cooperation with the antenna 216.

The received data processing unit 232 analyzes the received data supplied from the receiver circuit 220. Then, the received data that is for the upper layer is supplied to the interface 233. On the other hand, the paging instruction information that is received from the external server 30 is supplied to the controller 250 to be stored in the storage 260.

The interface 233 is an interface to and from the upper layer 240. The received data is outputted from the interface 233 to the upper layer 240 and the transmission data is inputted from the upper layer 240 to the interface 233.

The upper layer 240 is a functional unit for executing an application according to the UE 20. Notably, examples of the application include "Metering", "Health" and the like. When the application is "Metering", the transmission data is supposed as data indicating consumption amounts of water supply and electricity. Moreover, when the application is "Health", the transmission data is supposed as data indicating current physical status of the subject.

The transmission data processing unit 238 generates a data signal on the basis of the data supplied from the interface 133 to supply it to the transmitter circuit 222.

The controller 250 includes a communication controller 252, a timing detection unit 254, a counter 256 and a condition determination unit 258. The storage 260 stores the paging instruction information. The controller 250 controls the whole operation of the base station 10 using the paging instruction information stored in the storage 260.

(Timing Detection Unit)

The timing detection unit 254 detects paging candidate timing which arrives according to the user inherent DRX cycle TUE included in the paging instruction information. For example, according to formula 6 mentioned above, when the remainder obtained by dividing the SFN by the user inherent DRX cycle TUE is equal to the value obtained in the right side, the timing detection unit 254 detects the relevant SFN as the paging candidate timing.

(Counter)

The counter 256 counts elapse of a predetermined period. For example, the counter 256 starts counting from "0", increments a count value i every time the user inherent DRX cycle TUE elapses, and resets the count value i to "0" when the count value i reaches the extension parameter K included in the paging instruction information. Notably, the explanation is made for usage of the user inherent DRX cycle TUE by way of example as the predetermined period above, whereas the predetermined period may be the cell inherent DRX cycle Tc or may be a period no relation to the user inherent DRX cycle TUE or cell inherent DRX cycle Tc.

(Condition Determination Unit)

The condition determination unit 258 determines whether or not the shared condition shared with the base station 10 regarding the paging is satisfied. For example, the condition determination unit 258 determines that the shared condition is satisfied when the count value i obtained by the counter 256 is equal to the setting value x shared with the base station 10. Herein, the setting value x by way of example is represented as in formula 7 mentioned above.

(Communication Controller)

The communication controller 252 controls reception of the paging when the timing detection unit 254 detects the paging candidate timing and the condition determination unit 258 determines that the count value obtained by the counter 256 is equal to the setting value x. According to such a configuration, the period of the paging timing can be extended, for example, to the multiplication value of the inherent DRX cycle TUE and the extension parameter K. As a result, power consumption in the UE 20 can be reduced. Notably, since the functions of the communication controller 252 are largely common to the functions of the communication controller 152 of the base station 10, their description is herein omitted.

5. Operations of Base Station and UE

As above, the base station 10 and the UE 20 according to the embodiment have been described. Succeedingly, operations of the base station 10 and the UE 20 according to the embodiment are organized with reference to FIG. 8 and FIG. 9.

(Operation of UE 20)

FIG. 8 is a flowchart illustrating operation of the UE 20 according to the embodiment. As illustrated in FIG. 8, the UE 20 transmits the paging instruction information received from the external server 30 to the base station 10 in connection mode (S404). Afterward, when the UE 20 move to idle mode (S408), the counter 256 initializes the count value i (S412). Notably, information regarding initialization timing for the count value i may be included in the paging instruction information or processing of adjusting the initialization timing with the base station 10 may be separately performed.

Succeedingly, the condition determination unit 258 recognizes the count value i of the counter 256 (S416) and determines whether or not the count value i is equal to the setting value x indicated in formula 7 (S420). When the count value i is equal to the setting value x, the process proceeds to S424 and when the count value i is different from the setting value x, the process proceeds to S428.

Then, when it is determined that the count value i equal to the setting value x, the communication controller 252 performs receiving processing of the paging at a predetermined sub-frame of the SFN that is detected by the timing detection unit 254 and satisfies formula 6 (S424).

Afterward, when the user inherent DRX cycle TUE has elapsed after the initialization of the count value i or the previous update thereof (S428) and the count value i is not "K−1" (S432), the counter 256 increments the count value i. On the other hand, when the user inherent DRX cycle TUE has elapsed after the initialization of the count value i or the previous update thereof (S428) and the count value i is "K−1" (S432), the counter 256 initializes the count value i to "0" (S440). Then, after the processing in S436 or S440, the processing in and after S416 is repeated.

(Operation of Base Station)

FIG. 9 is a flowchart illustrating operation of the base station 10 according to the embodiment. As illustrated in FIG. 9, the base station 10 receives the paging instruction information from the UE 20 while the UE 20 is in connection mode (S504). Afterward, when the UE 20 move to idle mode (S508), the counter 156 initializes the count value i (S512). Notably, information regarding initialization timing for the count value i may be included in the paging instruction information or processing of adjusting the initialization timing with the UE 20 may be separately performed.

Succeedingly, the condition determination unit 158 recognizes the count value i obtained by the counter 156 (S516) and determines whether or not the count value i is equal to the setting value x indicated in formula 7 (S520). When the count value i is equal to the setting value x, the process proceeds to S524 and when the count value i is different from the setting value x, the process proceeds to S528.

Then, when it is determined that the count value i equal to the setting value x, the communication controller 152 performs receiving processing of the paging at a predetermined sub-frame of the SFN that is detected by the timing detection unit 154 and satisfies formula 6 (S524).

Afterward, when the user inherent DRX cycle TUE has elapsed after the initialization of the count value i or the previous update thereof (S528) and the count value i is not "K−1" (S532), the counter 156 increments the count value i. On the other hand, when the user inherent DRX cycle TUE has elapsed after the initialization of the count value i or the previous update thereof (S528) and the count value i is "K−1" (S532), the counter 156 initializes the count value i to "0" (S540). Then, after the processing in S536 or S540, the processing in and after S516 is repeated.

6. Conclusion

As described above, according to the embodiments, an interval of paging timing can be made longer while compatibility with existing terminals is maintained. As a result, power consumption in the UE 20 can be reduced.

The preferred embodiments of the present disclosure have been described above in detail with reference to the accompanying drawings, but the technical scope of the present disclosure is not limited to the above examples. A person skilled in the art may find various alterations and modifications within the scope of the appended claims, and it should be understood that they will naturally come under the technical scope of the present disclosure.

For example, each step of processing in the base station 10 and the UE 20 herein does not necessarily need to be performed chronologically in the order described as a sequence diagram or a flowchart. For example, each step of processing in the base station 10 and the UE 20 may be performed in an order different from the order described as a flowchart or in parallel.

Also, a computer program causing hardware such as a CPU, ROM, RAM and the like contained in the base station 10 or the UE 20 to function on a par with each configuration of the base station 10 or the UE 20 described above. In addition, a storage medium in which the computer program is stored is provided.

Additionally, the present technology may also be configured as below.

(1)

A communication terminal including:

a timing detection unit that detects arrival of timing according to a configured cycle;

a condition determination unit that determines whether or not a shared condition shared with a base station is satisfied; and a communication controller that controls reception of paging when the timing detection unit detects the arrival of timing and the condition determination unit determines that the shared condition is satisfied.

(2)

The communication terminal according to (1), further including a counter that counts elapse of a predetermined period, wherein the condition determination unit determines that the shared condition is satisfied when a count value obtained by the counter is equal to a setting value shared with the base station.

(3)

The communication terminal according to (2), wherein the predetermined period is the configured cycle.

(4)

The communication terminal according to (2) or (3), wherein the counter initializes the count value when the count value reaches the setting value.

(5)

The communication terminal according to any one of (2) to (4), wherein the setting value is reported from an external server to the communication terminal via the base station.

(6)

The communication terminal according to any one of (1) to (5), wherein the configured cycle is a discontinuous reception cycle for a terminal, the cycle being assigned individually to the communication terminal, or a discontinuous reception cycle common in a cell, the cycle being assigned in common to communication terminals in a cell of the base station.

(7)

A communication method including:

detecting arrival of timing according to a configured cycle;

determining whether or not a shared condition shared with a base station is satisfied; and controlling reception of paging when the arrival of timing is detected and it is determined that the shared condition is satisfied.

(8)

A base station including:

a timing detection unit that detects arrival of timing according to a configured cycle;

a condition determination unit that determines whether or not a shared condition shared with a communication terminal is satisfied; and a communication controller that controls transmission of paging to the communication terminal when the timing detection unit detects the arrival of timing and the condition determination unit determines that the shared condition is satisfied.

(9)

A communication method including:

detecting arrival of timing according to a configured cycle;

determining whether or not a shared condition shared with a communication terminal is satisfied; and controlling transmission of paging to the communication terminal when the arrival of timing is detected and it is determined that the shared condition is satisfied.

(10)

A communication system including:

a base station including a first timing detection unit that detects arrival of timing according to a configured cycle, a first condition determination unit that determines whether or not a shared condition is satisfied, and a first communication controller that controls transmission of paging when the first timing detection unit detects the arrival of timing and the first condition determination unit determines that the shared condition is satisfied; and a communication terminal including a second timing detection unit that detects the arrival of timing according to the configured cycle, a second condition determination unit that determines whether or not the shared condition shared with the base station is satisfied, and a second communication controller that controls reception of paging when the second timing detection unit detects the arrival of timing and the second condition determination unit determines that the shared condition is satisfied.

REFERENCE SIGNS LIST 10 base station
12 MME
14 S-GW
16 P-GW
20 UE
30 external server
150 controller
152 communication controller
154 timing detection unit
156 counter
158 condition determination unit
160 storage
250 controller
252 communication controller
254 timing detection unit
256 counter
258 condition determination unit
260 storage

The invention claimed is:

1. A communication terminal, comprising:
   circuitry configured to:
      detect arrival of timing according to a configured cycle;
      determine whether or not a condition shared with a base station is satisfied;
      receive shared condition information related to the shared condition; and
      control reception of paging in an event the arrival of timing is detected and the shared condition is determined to be satisfied in an event that the shared condition information include flag information indicating extension of a paging cycle,
   wherein the configured cycle corresponds to a first discontinuous reception cycle assigned individually to the communication terminal or a second discontinuous reception cycle common in a cell, both the first discontinuous reception cycle and the second discontinuous reception cycle being shorter than a cycle of system frame, wherein a first cycle of timing at which the arrival of timing is detected and the shared condition is determined to be satisfied is longer than the cycle of system frame, wherein the first cycle of timing is determined based on the first discontinuous reception cycle or the second discontinuous reception cycle, an extension parameter included in the shared condition information and a terminal ID, and
   wherein the circuitry is further configured to control the reception of the paging in accordance with a second cycle of timing determined based on the first discontinuous reception cycle or the second discontinuous reception cycle in an event that the flag information is not included in the shared condition information, the second cycle of timing being shorter than the cycle of system frame.

2. The communication terminal according to claim 1, further comprising a counter configured to count elapse of a period, wherein the circuitry is configured to determine that the shared condition is satisfied in an event a count value obtained by the counter is equal to a setting value shared with the base station.

3. The communication terminal according to claim 2, wherein the elapsed period is the configured cycle.

4. The communication terminal according to claim 2, wherein the counter is configured to initialize the count value in an event the count value reaches the setting value.

5. The communication terminal according to claim 2, wherein the setting value is reported from an external server to the communication terminal via the base station.

6. The communication terminal according to claim 1, wherein the configured cycle is assigned in common to communication terminals in a cell of the base station.

7. A communication method, comprising:
detecting arrival of timing according to a configured cycle;
determining whether or not a condition shared with a base station is satisfied;
receiving a shared condition information related to the shared condition;
controlling reception of paging in an event the arrival of timing is detected and it is determined that the shared condition is satisfied in an event that the shared condition information include flag information indicating extension of a paging cycle,
wherein the configured cycle corresponds to a first discontinuous reception cycle assigned individually to a communication terminal or a second discontinuous reception cycle common in a cell, both the first discontinuous reception cycle and the second discontinuous reception cycle being shorter than a cycle of system frame,
wherein a first cycle of timing at which the arrival of timing is detected and the shared condition is determined to be satisfied is longer than the cycle of system frame, and
wherein the first cycle of timing is determined based on the first discontinuous reception cycle or the second discontinuous reception cycle, an extension parameter included in the shared condition information and a terminal ID; and
controlling the reception of the paging in accordance with a second cycle of timing determined based on the first discontinuous reception cycle or the second discontinuous reception cycle in an event that the flag information is not included in the shared condition information, the second cycle of timing being shorter than the cycle of system frame.

8. A base station, comprising:
circuitry configured to:
detect arrival of timing according to a configured cycle;
determine whether or not a condition shared with a communication terminal is satisfied;
receive shared condition information related to the shared condition; and
control transmission of paging to the communication terminal in an event the arrival of timing is detected and the shared condition is determined to be satisfied in an event that the shared condition information include flag information indicating extension of a paging cycle,
wherein the configured cycle corresponds to a first discontinuous reception cycle assigned individually to the communication terminal or a second discontinuous reception cycle common in a cell, both the first discontinuous reception cycle and the second discontinuous reception cycle being shorter than a cycle of system frame,
wherein a first cycle of timing at which the arrival of timing is detected and the shared condition is determined to be satisfied is longer than the cycle of system frame,
wherein the first cycle of timing is determined based on the first discontinuous reception cycle or the second discontinuous reception cycle, an extension parameter included in the shared condition information and a terminal ID, and
wherein the circuitry is further configured to control the transmission of the paging in accordance with a second cycle of timing determined based on the first discontinuous reception cycle or the second discontinuous reception cycle in an event that the flag information is not included in the shared condition information, the second cycle of timing being shorter than the cycle of system frame.

9. A communication method, comprising:
detecting arrival of timing according to a configured cycle;
determining whether or not a condition shared with a communication terminal is satisfied;
receiving a shared condition information related to the shared condition;
controlling transmission of paging to the communication terminal in an event the arrival of timing is detected and it is determined that the shared condition is satisfied in an event that the shared condition information include flag information indicating extension of a paging cycle,
wherein the configured cycle corresponds to a first discontinuous reception cycle assigned individually to the communication terminal or a second discontinuous reception cycle common in a cell, both the first discontinuous reception cycle and the second discontinuous reception cycle being shorter than a cycle of system frame,
wherein a first cycle of timing at which the arrival of timing is detected and it is determined that the shared condition is satisfied is longer than the cycle of system frame, and
wherein the first cycle of timing is determined based on the first discontinuous reception cycle or the second discontinuous reception cycle, an extension parameter included in the shared condition information and a terminal ID; and
controlling the transmission of the paging in accordance with a second cycle of timing determined based on the first discontinuous reception cycle or the second discontinuous reception cycle in an event that the flag information is not included in the shared condition information, the second cycle of timing being shorter than the cycle of system frame.

10. The communication terminal according to claim 1, wherein a length of the system frame is 10 ms.

11. The communication terminal according to claim 1, wherein the cycle of system frame is 1024 system frames.

12. The communication terminal according to claim 11, wherein the extension parameter is configured to indicate the configured cycle, and the flag information is configured to indicate conduction of the paging according to the extension parameter.

* * * * *